Figure 1:
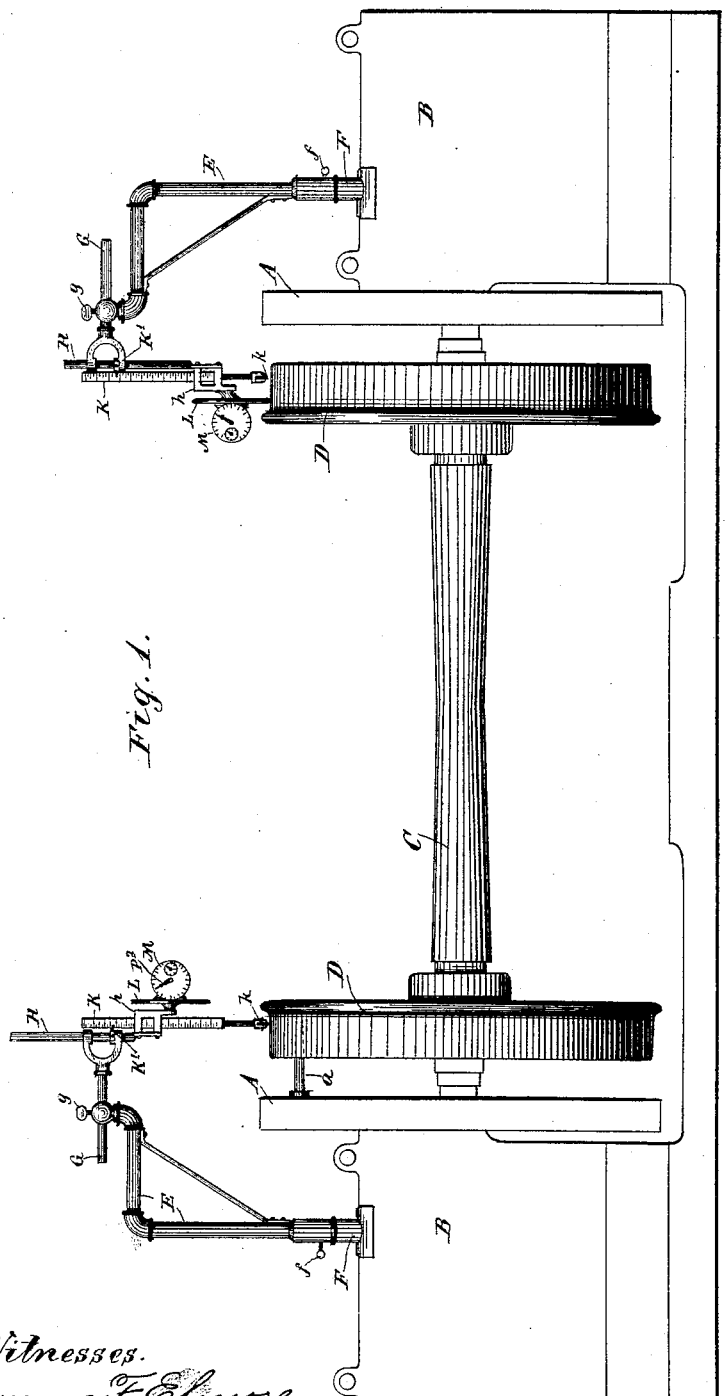

(No Model.) 2 Sheets—Sheet 1.
P. McCALLUM.
CIRCUMFERENCE INDICATOR AND TIRE GAGE.

No. 480,607. Patented Aug. 9, 1892.

Witnesses.
Emma F. Elmore
A. H. Opsahl.

Inventor.
Peter McCallum
By his Attorney
Jas. F. Williamson (No Model.) 2 Sheets—Sheet 2.
P. McCALLUM.
CIRCUMFERENCE INDICATOR AND TIRE GAGE.
No. 480,607. Patented Aug. 9, 1892.
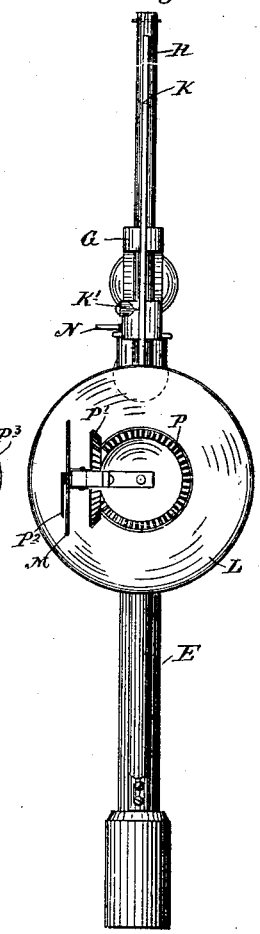
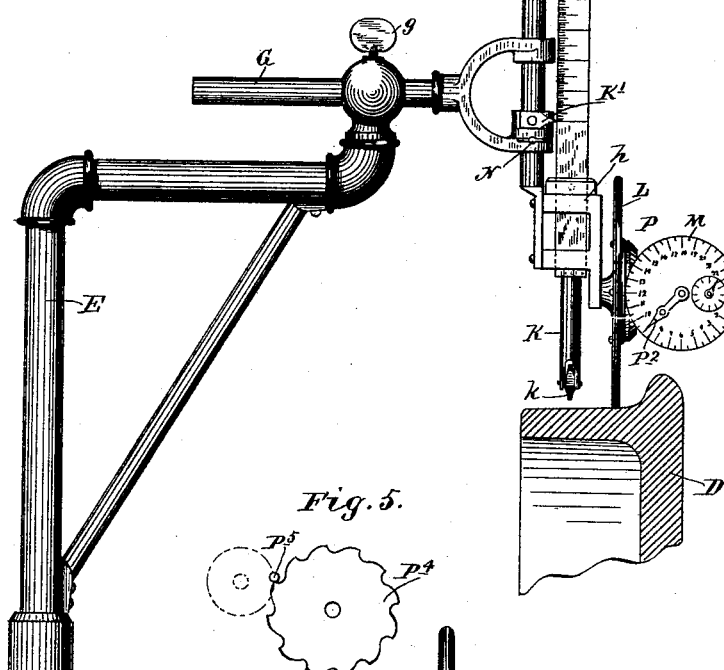
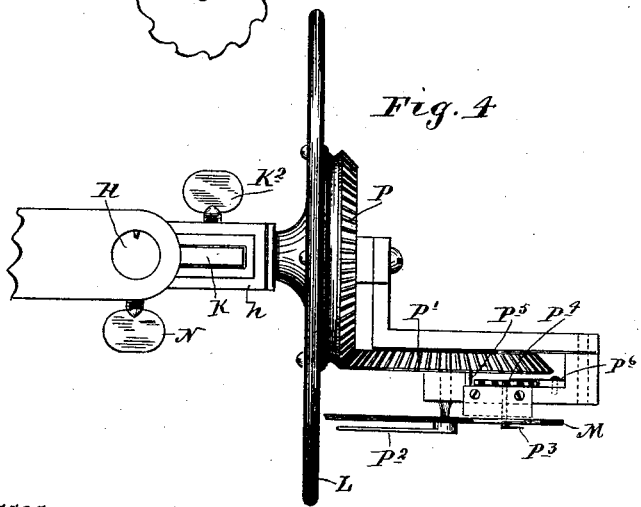
Witnesses.
Emma F. Elmore
A. H. Opsahl
Inventor.
Peter McCallum
By his Attorney.
Jas. F. Williamson

UNITED STATES PATENT OFFICE.

PETER McCALLUM, OF ST. PAUL, MINNESOTA.

CIRCUMFERENCE-INDICATOR AND TIRE-GAGE.

SPECIFICATION forming part of Letters Patent No. 480,607, dated August 9, 1892.

Application filed February 8, 1892. Serial No. 420,636. (No model.)

*To all whom it may concern:*

Be it known that I, PETER McCALLUM, a citizen of the United States, residing at St. Paul, in the county of Ramsey and State of Minnesota, have invented certain new and useful Improvements in Circumference-Indicators and Tire-Gages for Use in Turning Down Car-Wheels, &c.; and I do hereby declare the following to be a full, clear, and exact description of the invention, such as will enable others skilled in the art to which it appertains to make and use the same.

My invention has for its object to provide a convenient and reliable instrument of precision for use in connection with lathe-tools, when turning down circular bodies, so as to insure accuracy in the result, and especially for securing uniformity or exact correspondence in circumference of pairs of wheels coupled to move together on a common axle, like car-wheel trucks.

The application to car-wheel trucks is the use for which the instrument was especially designed, although it is capable of general application to circular bodies.

Hitherto in turning down truck-wheels reliance has been placed upon the ordinary calipers to determine the relative depth of the lathe-tool's cuts on the respective wheels, and the circumference, so far as I am aware, has hitherto been determined chiefly by calculation from the diameter. Calipers adapted to this use must necessarily be large, and in virtue of this fact there is so much spring in their parts as to make them inexact and unreliable.

My invention is free from any such defects, and the instrument involves two pairs or sets of tire-gages and two sets of circumference-indicators, adjustably mounted on two corresponding frames, adapted to be brought into radial line with the respective wheels and to be used in conjunction, so as to indicate both the absolute and relative depths of cut of the lathe-tools used on the two different wheels and also to measure and indicate both the absolute and the relative circumferences of the two wheels.

The invention is illustrated in the accompanying drawings, wherein, like letters referring to like parts throughout—

Figure 1 is a front view illustrating the application of the invention. Fig. 2 is an enlarged view in front elevation of one of the tire-gages and circumference-indicators detached. Fig. 3 is a right side elevation of the same. Fig. 4 is a plan view of the same, and Fig. 5 is a detail of a part of the registering device.

A are the face-plates of an ordinary lathe, centered in the pillow-blocks B.

C is the axle, and D the wheels, of an ordinary car-truck centered on the face-plate in the ordinary way and driven therewith by a driving pin or chuck *a*.

E are a pair of right-angled brackets removably secured one to each of the supports B. As shown the said brackets are made of gas-pipe and sleeved at their lower ends over fixed projections F, secured to the pillow-blocks, and are held together in whatever position the brackets may be set by means of a set-screw *f*. The horizontal parts of the bracket E are provided at their outer extremities with vertical extensions, in the ends of which are mounted for horizontal adjustment a pair of arms G. These arms, as shown, work through holes in the vertical extensions of the said brackets, and are secured in whatever position they may be set by clamping the set-screws *g*.

H are a pair of supports mounted for vertical adjustment in the horizontal arms G. The supports H have enlarged offset portions *h* at their lower ends, in which are mounted, with freedom for vertical motion, the pair of tire-gages K, and on the outer faces of which are mounted, with freedom for rotary motion, the pair of circumference-indicators L M, of which parts L represents the measuring-disk and M the registering device for denoting its travel. The tire-gages K carry at their lower extremities blade-like rollers or wheels *k*, which, as before stated, enter the trial-cuts of the lathe-tools. The faces of the tire-gages are marked with a suitable scale, which in the vertical movement of the gage move under fixed pointers K', carried on the horizontal arms G, thus indicating to the eye of the operator, both the absolute and relative positions of the said gages with reference to the said pointers. The said pointers stand at common radial distances from the centers of the wheels to be turned down. Hence the positions of the gages with reference to the pointers may be made to indicate the absolute and relative depths of the lathe-tool's cuts.

The measuring-disks L are both made of exactly the same circumference, and hence when made to traverse the peripheries of the wheels D or corresponding circular bodies being turned down may be made to indicate the absolute and relative circumferences of the same on the registers M. The driving connections to the said registers may be of any suitable kind. I employ for the purpose on each register a bevel-gear P, fixed to the face of the measuring-disk L, and in engagement with a bevel-gear P', having one of its journals extended through the center of the dial-plate and provided with an ordinary pointer $P^2$, which I use to indicate half-inches of travel. A smaller dial is also inscribed within the larger dial, and is designed to be marked with notations indicating feet. The pointer $P^3$, which moves over the foot-dial, is carried on the outer end of the journal of a notched wheel $P^4$, having twelve notches, which is driven at the proper time by a projecting stud $P^5$ on the hub of the beveled gear P', and is held by spring-tension from the flat spring $P^6$. It is obvious that every time the measuring-disk M makes a complete revolution the smaller wheel $P^4$ and the pointer $P^3$ will be moved forward one notch. The larger dial will thus indicate the subdivisions in twenty-fourths or half-inches of the measuring-disk's travel, and the smaller dial will indicate the number of its complete revolutions or the amount of its travel expressed in feet. The vertical supports H, together with the measuring-disks and the registers carried thereby, are securable in any position on the horizontal arms G by means of clamping set-screws N. The tire-gages K are securable in any position with reference to the offset portions $h$ of the supports H by means of set-screws $K^2$.

The operation of the instrument is as follows: The two lathe-tools (not shown) are first set in the ordinary way for preliminary or trial cuts. On car-wheels these trial-cuts are generally taken adjacent to the wheel-flanges. The tire-gages K are then dropped into the trial-cuts, and will indicate to the eye both the absolute and relative depths of the same. The tools may then be readily adjusted, so as to make thereafter cuts of the same depth. The tire-gages are then raised and secured by their respective set-screws $K^2$. The measuring-disks are then lowered onto the cut or turned-down portions of the wheels, and are thereafter permitted to traverse the same while the wheels are being turned down. If there be any discrepancy in the circumferences of the two wheels, the indicator-dials of the register will denote the same to the eye of the operator. The tools may then be re-set, if necessary, and the operation continued until the wheels are turned so as to be of exactly the same circumference.

It will of course be understood that the pointers K' should stand at exactly the same distance from the centers of the face-plates or the centers of the wheels and that the parts of the register must be made to move with accuracy.

It is evident that with this instrument car-wheels and similar circular bodies which are coupled to move together or on a common axle may be turned down with perfect accuracy, so that their circumferences will be exactly the same and be perfectly true.

The instrument is simple and of cheap construction, and is readily applied by any ordinary workman.

What I claim, and desire to secure by Letters Patent of the United States, is as follows:

1. A device for indicating the exact circumference of wheels and other circular bodies, the same consisting of a support adapted to be brought into radial line with the wheel, and a rotary measuring-disk adjustably mounted on said support, adapted to traverse the periphery of the wheel, and a registering device operated by the said disk to indicate its travel, substantially as described.

2. A pair of circumference-indicators for use in conjunction to indicate the absolute and relative circumferences of wheels mounted on a common axle when being turned down by a lathe-tool, the same consisting of a pair of measuring-disks adapted to traverse the corresponding wheels and provided each with a registering device to indicate the amount of its travel, thereby enabling the operator to turn down the said wheels, so as to be of exactly the same circumference.

3. As a new article of manufacture, an instrument for insuring accuracy in turning down car-wheels, the same consisting of a support adapted to be brought into radial line with the wheel to be turned, a tire-gage, and a circumference-indicator provided with a registering device mounted for independent adjustment on said support, substantially as and for the purpose set forth.

In testimony whereof I affix my signature in presence of two witnesses.

PETER McCALLUM.

Witnesses:
JAS. F. WILLIAMSON,
EMMA F. ELMORE.